Figure 1:
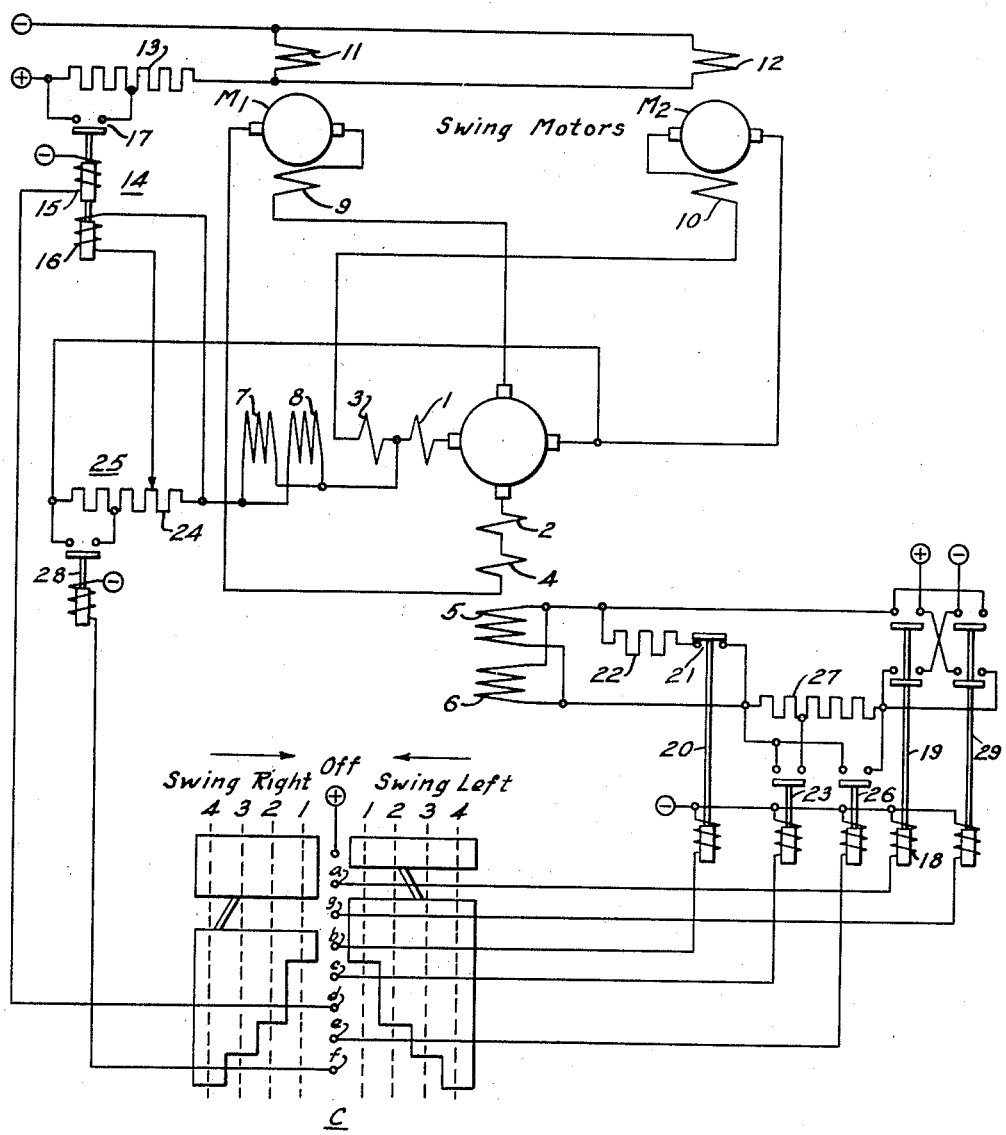

June 9, 1942.　　P. McSHANE　　2,285,673
CONTROL CONNECTION
Filed Feb. 5, 1941　　2 Sheets-Sheet 1

WITNESSES:

INVENTOR
Phelan McShane.
BY
Paul E. Friedemann
ATTORNEY

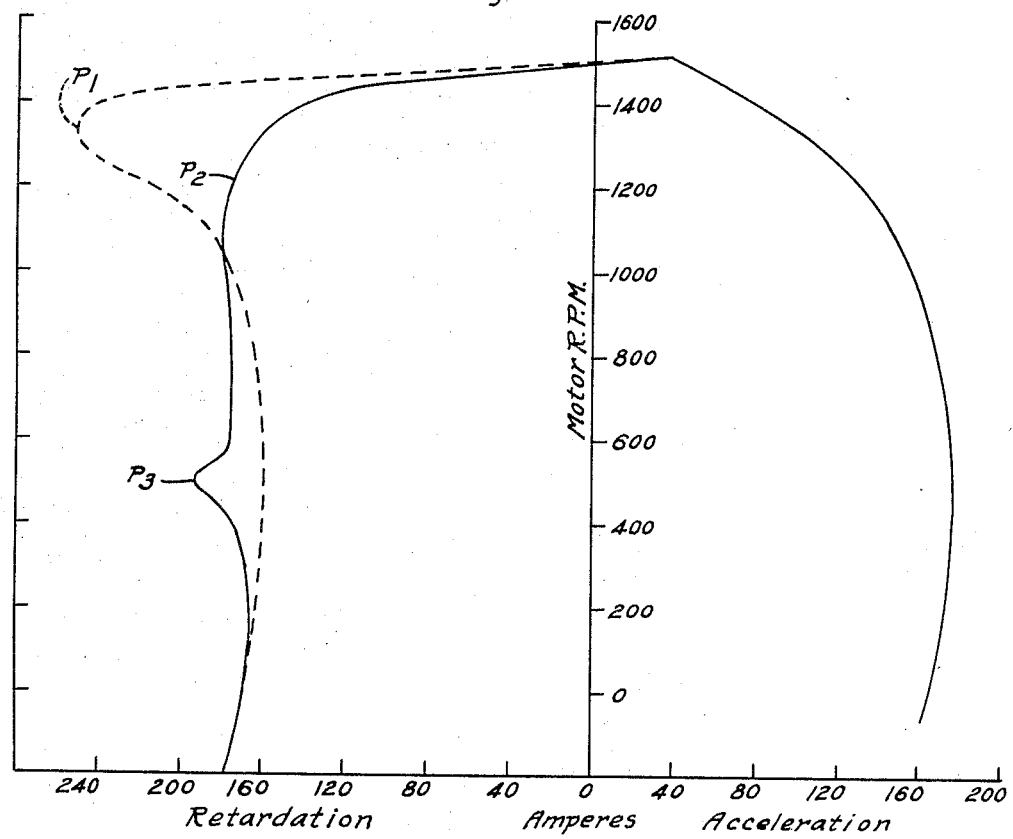

Patented June 9, 1942

2,285,673

UNITED STATES PATENT OFFICE 2,285,673

CONTROL CONNECTION

Phelan McShane, Pittsburgh, Pa., assignor to Westinghouse Electric & Manufacturing Company, East Pittsburgh, Pa., a corporation of Pennsylvania Application February 5, 1941, Serial No. 377,447

9 Claims. (Cl. 172—239)

My invention relates to an electric control system for effecting reversal of an electric motor, which is of general application but which is especially adapted to control the hoist or swing movements of an electric shovel.

My invention comprises an improvement over my earlier filed copending application, Serial No. 362,542, entitled Variable voltage control system and filed October 24, 1940. In such earlier filed case I have described the system in which the generator field strength of the separately excited field is controlled for the purpose of minimizing shocks and peak currents ordinarily resulting from sudden reversal of the motor by sudden movement of the controller. I have found, however, that a more positive control can be obtained by controlling the field strength of the motor directly instead of controlling the field strength of the generator as in the copending case, inasmuch as regeneration of the motor upon the generator plays an objectionable part during sudden reversal of the electric motor.

An object of my invention is to provide an electric control system for a motor which is particularly adapted to effect the hoist or swing motion of an electric shovel, which control system embodies the weakening of the motor shunt field winding upon reversing movement of the controller so as to minimize the effects of regeneration by the motor during the retardation (or sometimes called "plugging") period.

Stated broadly, an object of my invention is to provide a control system for effecting reversing of an electric motor, which control system minimizes the occurrence of peaked regenerative currents and shocks during retardation of the motor as a consequence of operation of the reversing switch.

Other objects and advantages will become more apparent from a study of the following specification when considered in conjunction with the accompanying drawings, in which:

Figure 1 is a schematic showing of a control system especially adapted to effect a swing or hoist motion of an electric shovel and embodying the principles of my invention; and Fig. 2 is a showing of curves indicating characteristics inherent in the device shown in Fig. 1.

Referring more particularly to Figure 1, G denotes a generator having commutating field windings 1 and 2 and series field windings 3 and 4 together with parallelly connected separately excited field windings 5 and 6 and self-excited parallelly connected shunt field windings 7 and 8. The generator armature may be driven by any suitable prime mover such as a main driving motor (not shown), which motor is usually used to drive the armature of an exciter for furnishing a constant voltage direct-current potential source such as indicated by the symbols (+) and (—), as used throughout the control diagram. The generator armature has been indicated as comprising two circuits having their output terminals 90° apart and having one pair of terminals connected in series with the generator series field windings 2 and 4, the armature of motor $M_1$ and its commutating field 9 and the other circuit including the generator series field windings 1 and 3, the commutating field winding 10 and the armature of the motor $M_2$.

The motor $M_1$ is provided with a separately excited field winding 11 while motor $M_2$ is provided with a separately excited field winding 12, which windings are connected in parallel with each other and are connected in series with a resistor 13 and a source of direct-current potential indicated by symbols (+) and (—). While a dual circuit generator and a pair of swing motors is shown, I wish to make it clearly understood that my invention is also applicable to a system in which there is provided an ordinary generator having only two output terminals which energizes a single driving motor.

The essence of my invention centers about the operation of a relay 14 having two oppositely wound energizing coils 15 and 16. The operation of this relay will appear more clearly from the following description of a typical sequence of operation of the entire control system.

When the controller C is in the "off" position, the contact members 17 of relay 14 are in the open position since the relay is deenergized. Let us now assume that the controller segments are moved to the right, more specifically to the first position of the "swing right" direction. An energizing circuit will thus be completed from the terminal marked (+) on the controller through fixed terminal $a$, coil 18 of the contactor 19 (which contactor may be regarded as the "swing right" contactor) to the (—) terminal. This will effect closing of the contact members of contactor 19 which will, in turn, complete an energizing circuit through such contact members so as to feed current through the generator separately excited field windings 5 and 6 in a particular direction so as to effect right swinging motion of the motors. Another energizing circuit will be completed from the fixed contact finger $b$ of the controller through the energizing coil of contactor 20, which effects opening of its contact members 21 and interruption of the well known bleeder circuit through resistor 22. At this first position it will be noted that coil 15 is still deenergized.

When the controller is moved to the No. 2 position in the "swing right" direction, an energizing circuit will be completed through the stationary controller contact finger c completing an energizing circuit for relay 23 which will effect closing of its contacts and shunting of a portion of resistor 27. Another energizing circuit will be completed from the controller stationary contact finger d and through relay coil 15, causing upward movement of the armature of relay 14 which results in closing of contact member 17 and shunting of a portion of resistor 13 which, in turn, will effect strengthening of the motor field windings 11 and 12. In the meantime the generator voltage is building up and the voltage drop across the resistor portion 24 of resistor 25, which is in series with the generator-self-sealed windings 7 and 8, is gradually increasing, so that the voltage applied to the lower relay coil 16 gradually builds up a force but in a direction opposite to the force produced by the voltage in coil 15. Although the magnetomotive force of the lower coil 16 may approach the value of the magnetomotive force of coil 15, it will not effect opening of the contact members 17, inasmuch as such contact members have already been sealed in by virtue of the energization of coil 15.

When the controller C is moved to the No. 3 "swing right" position, a circuit will be completed through stationary controller contact finger e which effects energization of relay 26 which, in turn, effects shunting of the entire resistor 27. On movement of the controller C to the No. 4 "swing right" position, an energizing circuit will be formed through the stationary controller contact finger f effecting energization of relay 28 which, in turn, will effect shunting of a portion of the resistor 25 so as to strengthen the self-excitation of the generator.

Let us now assume that it is desired to reverse the motor and that controller C is moved towards the "swing left" direction. In the course of this movement of the controller and as the "off" position is reached, the upper coil 15 of relay 14 becomes deenergized. Therefore, by virtue of the voltage still existing in the generator and the voltage drop still existing across the resistor portion 24, the lower coil 16 is still fully energized. Therefore, it will effect downward movement of the armature of relay 14 and opening of contact member 17 which results in weakening of the motor shunt field windings 11 and 12.

Let us assume now that the controller C is moved still further to its No. 1 "swing left" position. At this point the energizing circuit through controller contact finger a is interrupted, whereas an energizing circuit through controller contact finger g is completed which effects operation of the "swing left" contactor 29 which closes its contact members and completes an energizing circuit through the generator separately excited field windings 5 and 6 in a direction opposite to that previously described. This reversal of the generator separately excited field will effect reversal of the direction of drive of motors $M_1$ and $M_2$. If the controller is moved, further, to the No. 2 "swing left" position, a circuit will be reestablished through the upper coil 15 of relay 14. The motors $M_1$ and $M_2$ now act as generators and will regenerate a current which would be of abnormal value if it were not for the weakening of fields 11 and 12 during this retardation period. As the generator self-excited field voltage decreases and as the voltage drop through resistor portion 24 decreases sufficiently, the upper coil 15 will then again effect operation of relay 14, lift its armature and close contact members 17 so as to again strengthen the motor field windings 11 and 12. Closing of contact members 17 may be made to occur at a point very near the end of the deceleration of the swing motion. The reason for connecting coil 15 to the second position of the controller C is to make certain that when the operator plugs, that is, effects reverse movement of the controller, that the bottom coil will be energized before the top coil so as to positively assure that contact members 17 will be open during the plugging operation and insure that the motor shunt field windings will be weakened during this period. The circuits for the third and fourth "swing left" positions are the same as those previously described with respect to the third and fourth "swing right" position.

The dotted curve in Fig. 2 shows the motor characteristic of systems known in the art. The peaked current value at $P_1$ is very objectionable. The full line curve shows the motor characteristic of the present system. Note the smaller peaked current $P_2$ and the point $P_3$ at which relay 14 operates. The torque is sustained for a longer period as will be apparent from the curve.

It will thus be seen that I have provided a simple and positive acting control system which would always assure weakening of the motor fields 11 and 12 following reversing movement of the controller, that is, during the time the motor acts as a generator and regulates current and which will always restrengthen such field after a predetermined time, that is, the time after which there is no danger of occurrence of peak currents or sudden shock to the system. Inasmuch as resistor 25 is variable, the point at which the motor shunt field windings 11 and 12 are restrengthened after reversal of the motors can be adjusted at will, so as to occur at any desirable point after the danger of high peak currents, or excessive shock, accompanying the reversal has subsided.

I prefer to completely separate the magnetic circuits associated with coils 15 and 16 so that the flux produced by one will have no effect on the flux produced by the other. This is desirable because otherwise when current flows in coil 16 in one direction, the flux produced thereby assists in holding contact members 17 apart, whereas when current flows through coil 16 in an opposite direction, its flux assists that produced by coil 15. This interaction causes the contact members 17 to close at lower voltages in one direction of motor rotation than in the other. It is, therefore, desirable to separate the magnetic circuits.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. An electric control system for reversing an electric motor with minimum shock comprising, in combination, an electric motor, having an armature and shunt field winding, an exciting source of potential for said field winding, a variable voltage supply source for said motor including a generator having an armature in series circuit relationship with the armature of said motor, circuit means including a reversing controller for effecting reversal of said motor, and relay means responsive to generator voltage and to the position of said controller for effecting weakening of said motor shunt field winding upon reversing movement of said controller.

2. An electric control system for reversing an electric motor with minimum shock comprising, in combination, an electric motor, having an armature and shunt field winding, an exciting source of potential for said field winding, a variable voltage supply source for said motor including a generator having an armature in series circuit relationship with the armature of said motor, circuit means including a reversing controller for effecting reversal of said motor, and a relay having an armature which is biased in opposite directions under the influence of two oppositely wound coils, one of said coils being energized by said exciting source of potential through said controller, the other of said coils being energized by the voltage of the generator, said relay including contact means which are effective to weaken said motor shunt field winding upon reversing movement of said controller.

3. An electric control system for effecting reversal of a drive motor on an electric shovel comprising, in combination, a direct current motor having an armature and a shunt field winding, a shunt field circuit including a source of direct current energizing potential, resistance means and said field winding, a variable voltage supply source for said motor including a generator having an armature in series circuit relationship with the armature of said motor and having a separately excited field which is energized by said direct current potential, a resistor and a self-excited generator field winding in series relationship with said generator armature, circuit means including a reversing controller for effecting reversal of said motor by reversing the direction of energization of said separately excited generator field winding, and means responsive to the position of said controller and to the generator voltage across a portion of said last mentioned resistor for effecting weakening of said motor shunt field winding upon reversing movement of said controller.

4. Apparatus as in claim 3 in which the last mentioned means includes a relay having an armature which is movable under the influence of two oppositely wound coils which bias said armature in opposite directions, respectively, one of said coils being energized by said exciting source of potential through said controller, the other of said coils being energized by the voltage of the generator, said relay including contact means which are effective to weaken said motor shunt field winding upon reversing movement of said controller.

5. Apparatus as in claim 3 in which said last mentioned resistor is variable and in which said last mentioned means includes a relay operable by two oppositely wound coils, one of which is energizable by a constant voltage source of energizing potential and the other which is energizable by the portion of the generator voltage drop across said last mentioned variable resistor, said relay also including contact members which are effective to remove a shunt on a portion of said first mentioned resistance means to weaken said motor shunt field winding upon reversing movement of said controller.

6. Apparatus as in claim 3 in which a second drive motor is provided to aid the first motor and which is energizable by the same shunt field energizing source, and having its armature in series circuit with the generator armature.

7. Apparatus as in claim 2 in which said first mentioned relay coil is connected to the second speed position of said controller to assure operation of the relay in response to generator voltage upon reversing movement of said controller.

8. An electric control system for effecting reversal of a drive motor on an electric shovel comprising, in combination, a direct current motor having an armature and a shunt field winding, a shunt field circuit including a source of direct current energizing potential, resistance means and said field winding, a variable voltage supply source for said motor including a generator having an armature in series circuit relationship with the armature of said motor and having a separately excited field which is energized by said direct current potential, a resistor and a self-excited generator field winding in series relationship with said generator armature, circuit means including a reversing controller for effecting reversal of said motor by reversing the direction of energization of said separately excited generator field winding, and means responsive to the position of said controller and to the generator voltage across a portion of said last mentioned resistor for effecting weakening of said motor shunt field winding upon reversing movement of said controller, said last mentioned means including a relay having an armature which is movable under the influence of two differentially wound coils, one of said coils being energized by said exciting source of potential through the second speed position of said controller, the other of said coils being energized by the voltage of the generator, said relay including contact means which are effective to weaken said motor shunt field winding upon reversing movement of said controller.

9. An electric control system for reversing an electric motor with minimum shock comprising, in combination, an electric motor, having an armature and shunt field winding, an exciting source of potential for said field winding, a variable voltage supply source for said motor including a generator having an armature in series circuit relationship with the armature of said motor, circuit means including a reversing controller for effecting reversal of said motor, means responsive to the position of said controller for effecting weakening of said motor shunt field winding upon reversing movement of said controller, said last mentioned means including a resistor in series with the motor shunt field winding, and a relay having normally open contact members which are adapted to bridge a portion of said resistor, and having a pair of oppositely wound coils, one of which is energizable by a constant voltage applied by said exciter source and through said controller, and the other which is permanently energizable by a portion of the generator voltage.

PHELAN McSHANE.